United States Patent [19]

Jain et al.

[11] 4,299,338
[45] Nov. 10, 1981

[54] VALVE SYSTEM

[75] Inventors: Sulekh C. Jain, Schrewsbury; Paul W. Forkey, Spencer, both of Mass.

[73] Assignee: Wyman-Gordon Company, Worcester, Mass.

[21] Appl. No.: 79,263

[22] Filed: Sep. 27, 1979

[51] Int. Cl.³ .................................... F16K 31/524
[52] U.S. Cl. ................................. 222/152; 222/461; 222/505; 222/545; 222/558; 137/613
[58] Field of Search ............... 222/554, 545, 149, 152, 222/506, 505, 522, 558, 461

[56] References Cited

U.S. PATENT DOCUMENTS

| | | | |
|---|---|---|---|
| 626,477 | 6/1889 | Archambault | 222/554 X |
| 642,161 | 1/1900 | Sargent et al. | 222/558 |
| 693,248 | 2/1902 | Einstein | |
| 1,177,107 | 3/1916 | Holtby | 222/505 X |
| 1,442,137 | 1/1923 | Falkiner | |
| 2,040,703 | 5/1936 | McCrery | 222/558 X |
| 3,227,312 | 1/1966 | Solvik et al. | |
| 3,622,045 | 11/1971 | Delaney et al. | 222/152 X |
| 4,108,337 | 8/1978 | Iijima | |

FOREIGN PATENT DOCUMENTS 379206  8/1923  Fed. Rep. of Germany ...... 222/505

Primary Examiner—Joseph J. Rolla
Assistant Examiner—Frederick R. Handren
Attorney, Agent, or Firm—Norman S. Blodgett; Gerry A. Blodgett

[57] ABSTRACT

Valve system having a primary valve for excluding air, mounted in series with a secondary valve for controlling the flow of powder.

13 Claims, 8 Drawing Figures

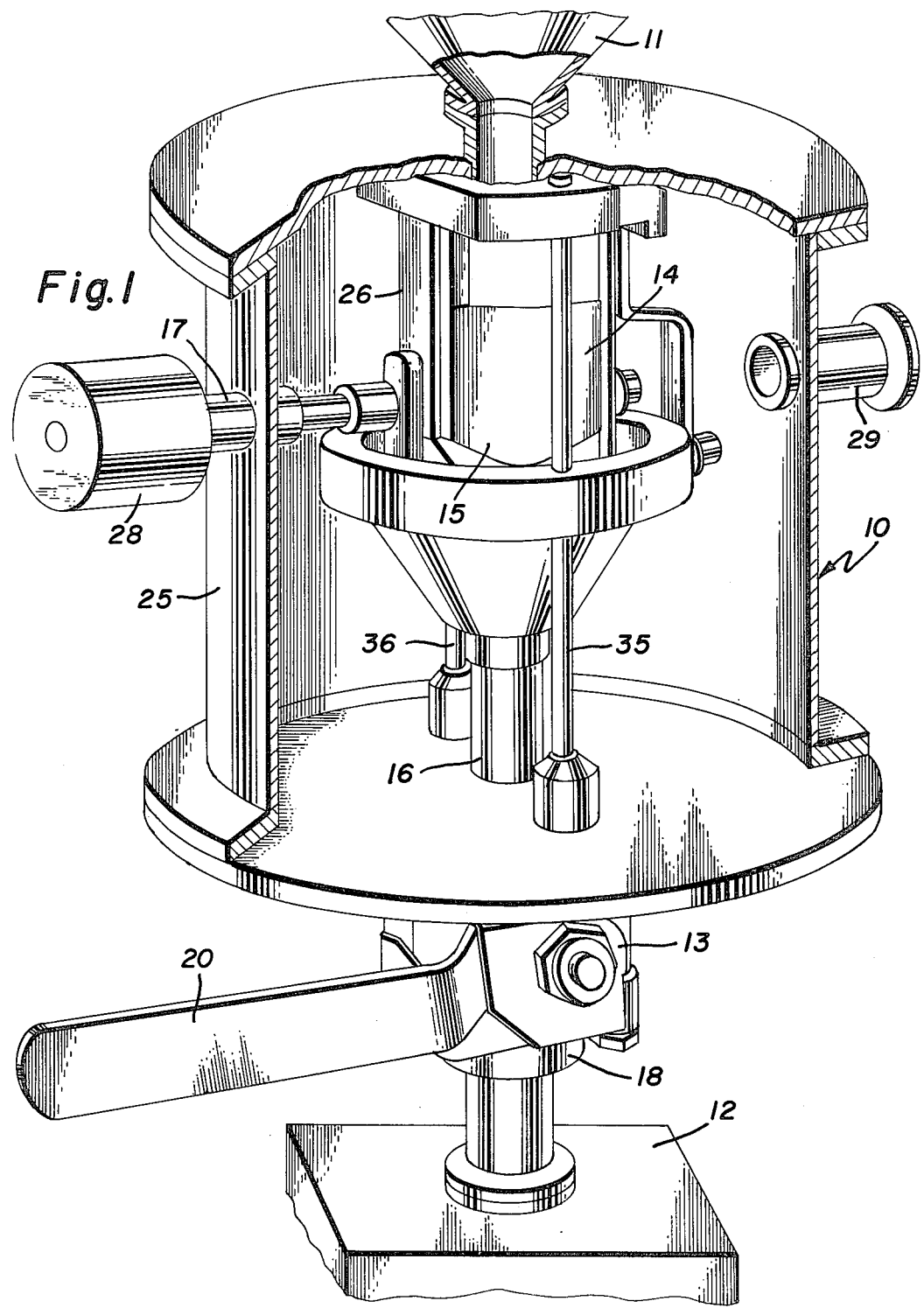

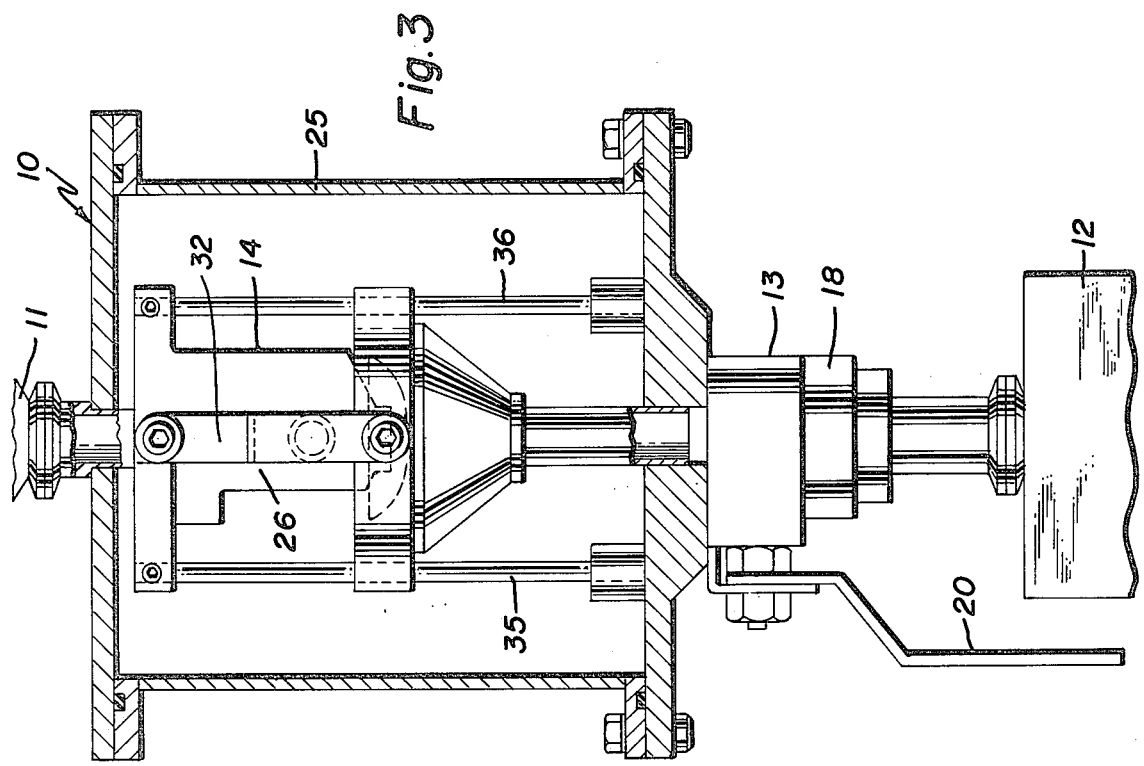
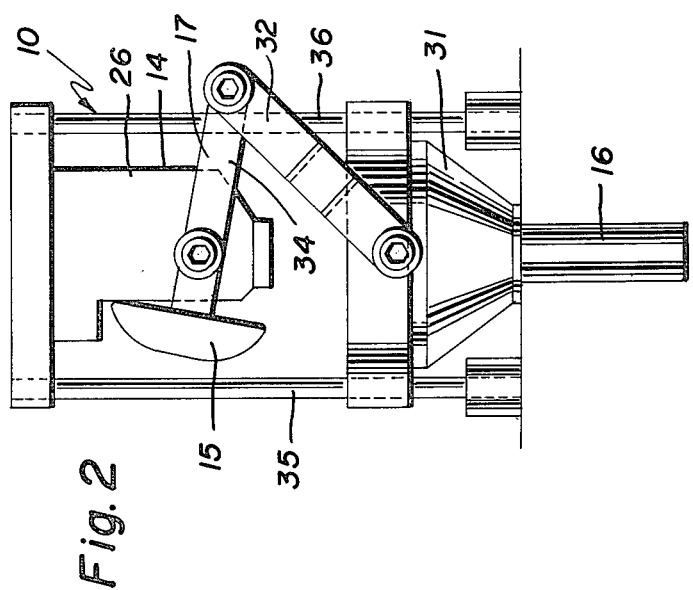

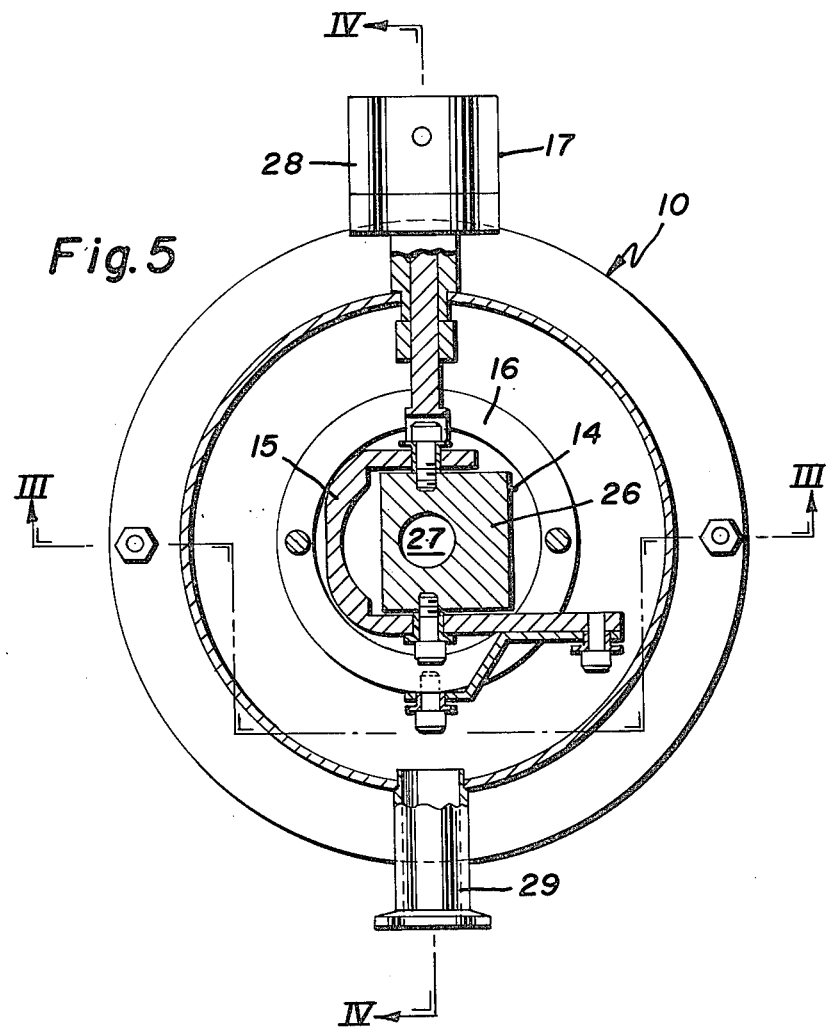

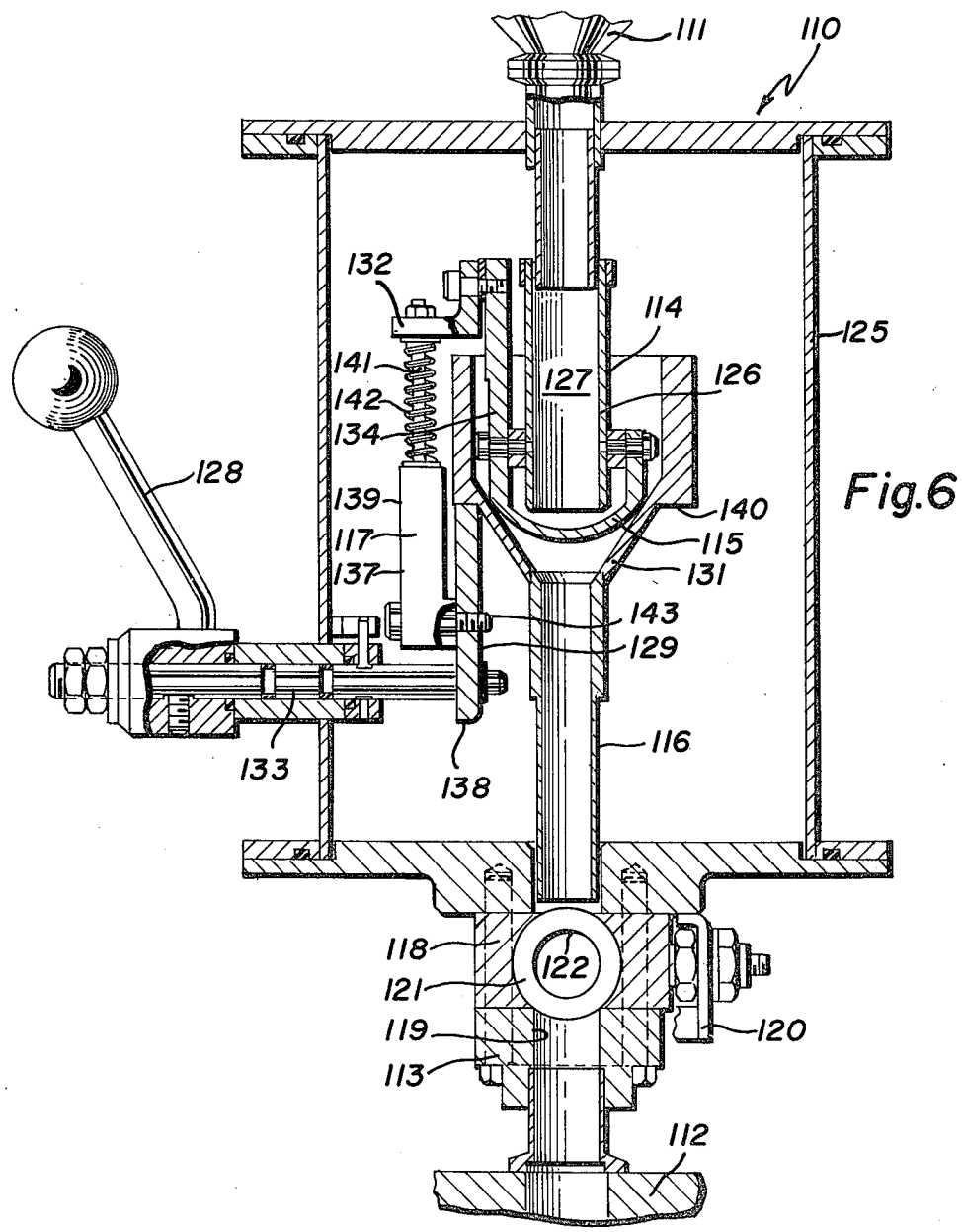

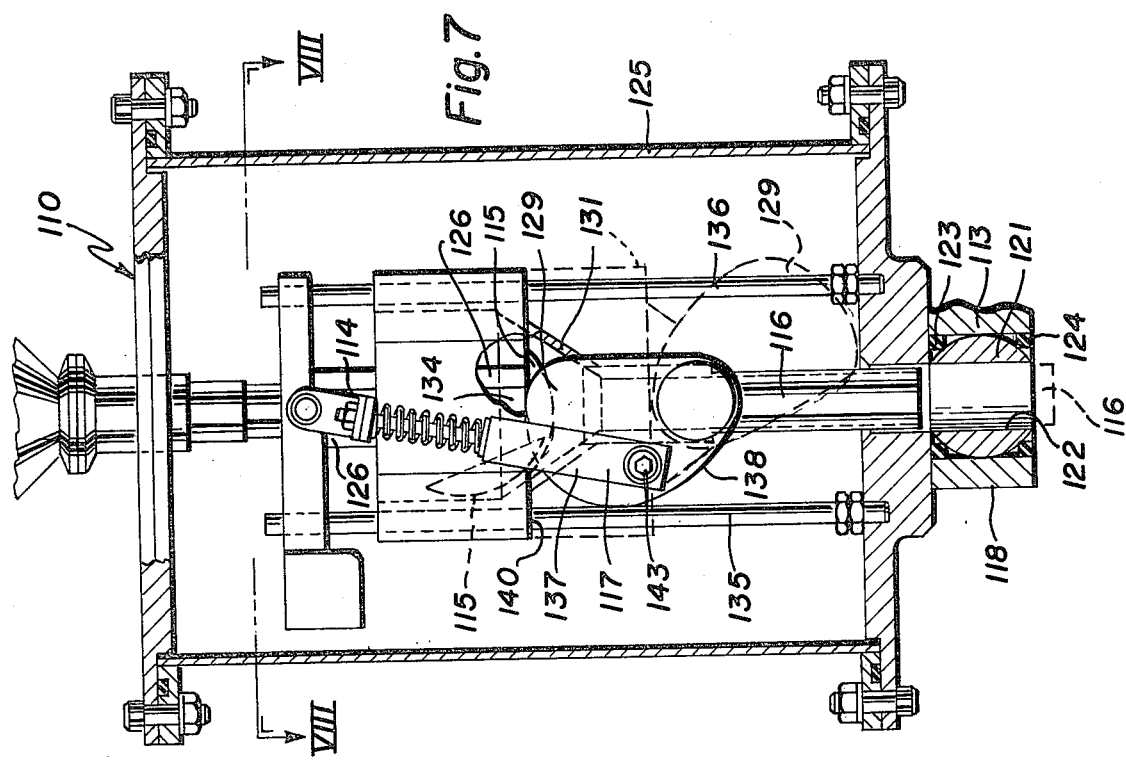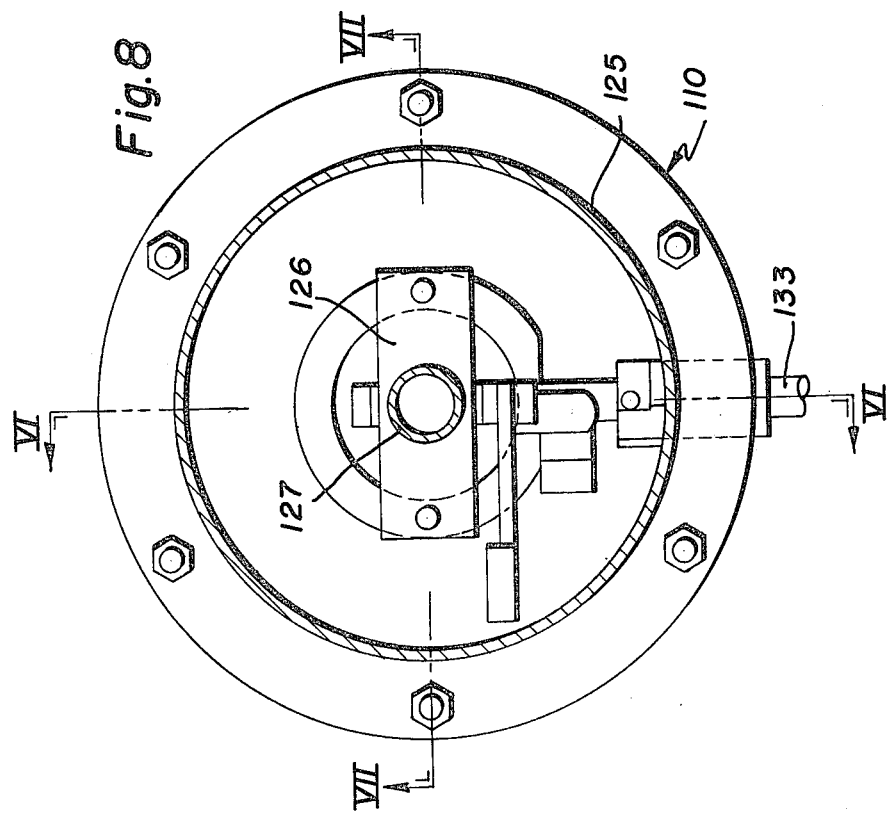

VALVE SYSTEM

BACKGROUND OF THE INVENTION

There are many situations in industry where it is necessary to transfer particulate material from one container to another without contamination from the atmosphere. Such a situation exists, for instance, in the art of powder metallurgy in which it is necessary to transfer raw powdered metal from its storage hopper to a mold. Exposure of the powder to air can cause oxidation of the metal particles, so that they will not enter properly into the compressing and sintering process. It is, of course, possible to shut off the transfer apparatus from the atmosphere, after the mold has been filled, by closing an air-tight valve. Such valves, however, in order to be truly air-tight must make use of seals made of an elastomer material and the fact that the metal powders are abrasive causes these seals to be quickly worn and, thus, they leak. More importantly, however, the abrasive metal particles remove particles of the elastomer material, so that the powder is contaminated. These and other difficulties experienced with the prior art devices have been obviated in a novel manner by the present invention.

It is, therefore, an outstanding object of the invention to provide a valve system for controlling the flow of particulate material without exposure to the atmosphere.

Another object of this invention is the provision of a valve assembly for use in transferring abrasive powders, including an air-tight valve and means for assuring that the elastomer elements of the valve are not damaged and do not contaminate this powder.

It is another object of the instant invention to provide a valve system including a primary valve for excluding air and a secondary valve for transferring material.

It is another object of the instant invention to provide a valve system for permitting the flow of powdered metal from a hopper to a mold without exposure to the atmosphere.

A still further object of the invention is the provision of a valve system permitting the flow of material without exposure to contaminating elements.

It is a further object of the invention to provide a valve system which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a valve system for joining a storage container to a use device, the system having a primary valve, including a ball with a bore and a seal formed of an elastomer material engaging the ball. A secondary valve is provided, including a main body having a passage, a stop removable from a first position closing the passage to a second position in which the passage is not closed, and a tube extending coaxially of the passage and movable axially from a first position away from the ball to a second position in which the tube lies within the bore of the ball.

More specifically, an actuator is provided to move the stop and the tube in synchronization from their first positions to their second position. An air-tight container surrounds the secondary valve and the actuator includes a handle mounted externally of the container for operating the stop and the tube. The container is provided with a connection for attaching it to an evacuating means. A funnel is attached to the upper end of the tube to receive material as it flows from the passage in the secondary valve. A link is connected between the stop and the tube to bring about the said synchronization.

BRIEF DESCRIPTION OF THE DRAWINGS

The character of the invention, however, may be best understood by reference to one of its structural forms, as illustrated by the accompanying drawings, in which:

FIG. 1 is a perspective view, with portions broken away, of a valve system incorporating the principles of the present invention, FIG. 2 is a side elevational view of a portion of the system, FIG. 3 is a sectional view of the system, taken on the line III—III of FIG. 5, FIG. 5 is a horizontal sectional view of the system taken on the line V—V of FIG. 4.

FIG. 6 is a vertical sectional view of a modified form of the system, taken on the line VI—VI of FIG. 8, FIG. 7 is a vertical sectional view of the modification of the system, taken on the line VII—VII of FIG. 8, and FIG. 8 is a horizontal sectional view of the system taken on the line VIII—VIII of FIG. 7.

DESCRIPTION OF THE PREFERRED EMBODIMENT

Figure 4:
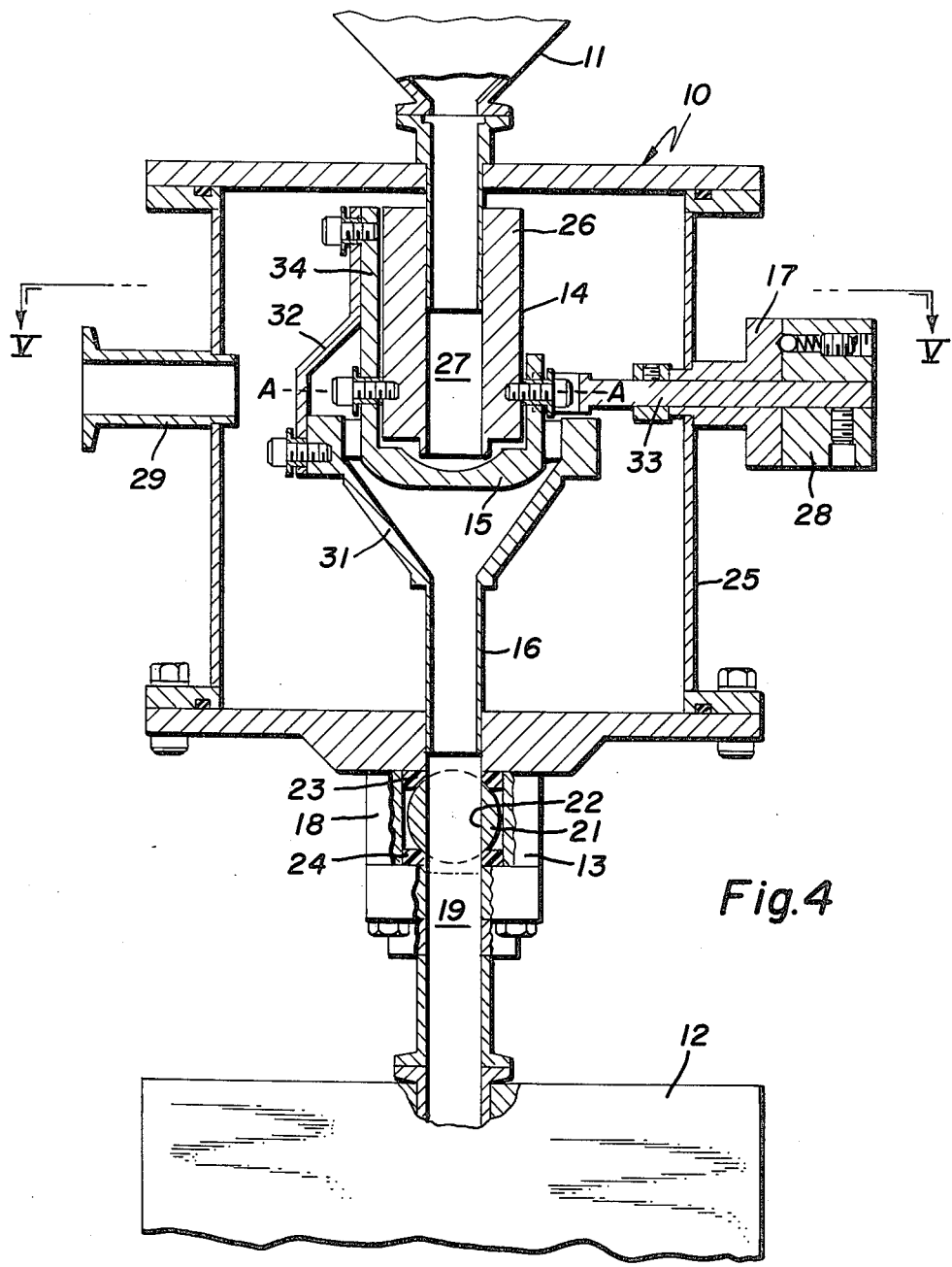
FIG. 4 is a vertical sectional view of the system taken on the line IV—IV of FIG. 5.

Referring first to FIG. 1, wherein are best shown the general features of the invention, the valve system, indicated generally by the reference numeral 10, is shown connecting a storage container, such as a hopper 11, to a use device, such as a mold 12. A primary valve 13 of the ball-type is connected on its lower side to the mold 12. A secondary valve 14 connects the hopper 11 to the upper side of the valve 13. The secondary valve includes a stop 15 which is movable from a first position to a second position. The secondary valve also includes a tube 16 which is movable axially from a first position away from the primary valve 13 to a second position lying within the valve. An actuator 17 moves the stop 15 and the tube 16 in synchronization from their first positions to their second positions.

FIGS. 2–5 show the details of the invention, including the fact that the primary valve 13 is provided with a main body 18 having a passage 19 extending through it. Located in the passage is a ball 21 having a bore 22. Also included in the passages are seals 23 and 24 formed of an elastomer material that engage the surface of the ball in air-tight sealing relationship.

Generally speaking, the valve system is arranged to allow vertical flow of a particulate material, such as a metal powder, from the hopper 11 to the mold 12 along a vertical line. The passage 19 of the primary valve 13 is in alignment with this line and is connected on one end to the mold 12. The ball 21 can be rotated about a transverse axis by means of a handle 20, so that the bore 22 can be placed in alignment with the passage 19 or located at a right angle thereto. An air-tight container 25 is mounted between the hopper 11 and the primary valve 13, the upper end of the container being connected to the hopper 11 and the lower end to the main body of the primary valve.

The secondary valve 14 is mounted in the container and includes a main body 26 having a passage 27 in alignment with the said vertical line and connected at its upper end to the hopper. The stop 15 is movable from a first position at which it closes the lower end of the passage 27 to a second position at which it is out of alignment with the passage (as shown in FIG. 2), the movement being brought about by means of a handle 28 mounted externally of the container 25. As is evident in FIG. 4, the vertical movement of the tube 16 causes it to enter and lie within the bore 22 in the ball 21 of the primary valve when the ball is arranged with the bore 22 in alignment with the vertical line.

The rotatable handle 28 is connected to the stop 15 and the tube 16 to move them in synchronization from their first positions to their second positions. The container 25 is provided with a connection 29 which permits it to be connected to a gas-evacuating means, such as a vacuum pump. A funnel 31 is connected to the top end of the tube 16 to receive powder from the passage 27 in the main body of the secondary valve. A link 32 is connected between the stop 15 (on the one hand) and the funnel 31 (on the other hand) to bring about the said synchronization.

The stop 15 is in the form of a cup which is pivotally mounted on the main body 26 for swinging movement about an axis extending transversely of the passage 27. A shaft 33 concentric with the last-named axis extends from the cup to and through the wall of the container with the actuating handle 28 attached to the outer end of the shaft. The stop 15 includes a bell crank 34 integrally formed with the cup. Two guide rods 35 and 36 are mounted within the container spaced from and parallel to the said vertical line and the funnel 31 is provided with vertical bores by which it is vertically slidable on these rods.

The operation and the advantages of the present invention will now be readily understood in view of the above disclosure. Normally, the hopper 11 is filled with the powder which is to be dispensed and fills the passage 27 as far as the stop 15. The funnel 31 is located in its first or upper position, so that the tube 16 is also in the upper position shown in FIG. 4. In this condition, the ball-valve lies in its closed position of rotation, so that the bore 22 extends transversely of the passage 19 and the seals 23 and 24 prevent the entrance of any gas into the system. When dispensing is to take place, the vacuum pump operates through the connection 29 to evacuate the container 25. When the mold 12 (which is now empty) has been closed tightly, it is possible to actuate the handle 20 to open the primary valve 13. The ball 21 is rotated to bring the passage 22 into alignment with the passage 19. The handle 28 is then rotated, causing the stop 15 to move into its second or inoperative position, while at the same time moving the tube 16 down into the bore 22 in the ball 21. The powder flows from the hopper 11 into the mold, passing first through the passage 27, into the funnel 31, through the tube 16, and through the passage 19 into the mold. At that time the tube 16 protects the seals 23 and 24, so that the powder and its abrasive quality cannot come in contact with it and, furthermore, so that powder cannot lodge in the inerstices between the surface of the ball 21 and the seals. As soon as the transfer of powder has taken place, the handle 28 is reversed thus cutting off the flow of powder from the passage 27 and at the same time removing the tube 16 from the bore 22 of the ball-valve. The ball-valve is then rotated into its closed position, so that, irrespective of what happens to the mold as it is opened and the molded product removed, air cannot flow up into the container 25 and into the powder.

It can be seen then that it is possible by use of the present invention to transfer an atmosphere-sensitive powder from the hopper 11 into the mold 12 without contact with air and without contamination by particles of valve seal material. Because of the presence of the tube 16 within the passage of the valve 13 at the time that the powder transfer takes place, the abrasive material cannot act on the seals 23 and 24 or on the surface of the ball 21. Otherwise, such abrasive action could take place during the passage of the powder and also powder could lodge in the interstices. Any powder carried between the surface of the ball and the seals, as the ball is opened and closed, could cause some wear on the metal ball, but more particularly, could cause wear on the elastomer seals 23 and 24. Because of their very nature in providing the soft, resilient, sealing action, the seals are particularly susceptible to abrasion. Therefore, the seals will not be worn and lose their function of air-tight sealing, and the addition of contaminating elastomer particles to the powder does not take place. Because of the simplicity of the construction, it is possible to clean all of the passages on occasion to remove any contaminated powder.

FIGS. 6, 7, and 8 show a modified form of the invention, wherein the valve system is indicated generally by the reference numeral 110. The system connects a storage container, such as a hopper 111, to a use device, such as a mold 112. A primary valve 113 of the ball-type is connected on its lower side to the mold 112. A secondary valve 114 connects the hopper 111 to the upper side of the valve 113. The secondary valve includes a stop 115 which is rotatably movable from a first position to a second position. The secondary valve also includes a tube 116 which is movable axially from a first position spaced from the primary valve 113 to a second position lying within the valve. An actuator 117 moves the stop 115 and the tube 116 in synchronization from their first positions to their second positions.

The primary valve 113 is provided with a main body 118 having a passage 119 passing through it. Located in the passage is a ball 121 having a bore 122. Also included in the passages are seals 123 and 124 formed of an elastomer material, the seals engaging the surface of the ball in air-tight sealing relationship.

Generally speaking, the valve system 110 is arranged to allow vertical flow of a particulate material, such as a metal powder, from the hopper 111 to the mold 112 along a vertical line. The passage 119 of the primary valve 113 is in alignment with this line and is connected on one end to the mold 112. The ball 121 can be rotated about a transverse axis by means of a handle 120, so that the bore 122 can be selectively placed in alignment with the passage 119 or located at a right angle thereto. An air-tight container 125 is mounted between the hopper 111 and the primary valve 113, the upper end of the container being connected to the hopper 111 and the lower end to the main body 118 of the primary valve.

The secondary valve 114 is mounted in the container 125 and includes a main body 126 having a passage 127 in alignment with the said vertical line and connected at its upper end to the hopper. The stop 115 is rotatably movable from a first position at which it closes the lower end of the passage 127 as shown in FIGS. 6 and 7 to a second position at which it is out of alignment with the passage (as shown by the dotted lines in FIG. 7). The synchronized movement of stop 15 and tube 16 is brought about by means of a handle 128 mounted externally of the container 125. As is evident in FIG. 7, the vertical downward movement of the tube 116 causes it to move from the full-line position to the dotted line position. This enables tube 116 to enter and lie within the bore 122 in the ball 121 of the primary valve when the ball is arranged with the bore 122 in alignment with the vertical line.

The rotatable handle 128 is connected to the stop 115 and the tube 116 to move them in synchronization from their first positions to their second positions. A funnel 131 is connected to the top end of the tube 116 to receive powder from the passage 127 in the main body of the secondary valve. The link 132 is connected between the stop 115 (on the one hand) and the funnel 131 (on the other hand) to bring about the said synchronization.

The stop 115 is in the form of a cup which is pivotally mounted on the main body 126 for swinging movement about an axis extending transversely of the passage 127. A shaft 133 is rotatable about an axis which is parallel to the last-named axis and extends through the wall of the container 125 with the actuating handle 128 attached to its outer end. The stop 115 includes a bell crank 134 integrally formed with the cup. Two guide rods 135 and 136 are mounted within the container 125 and are spaced from and parallel to the said vertical line, while the funnel 131 is provided with vertical bores by which it is vertically slidable on these rods.

The actuator 117 includes a cam 129 which takes part in the movement of the stop 115 and the tube 116. The cam 129 is fastened to the shaft 133 for rotation therewith. A link 137 is connected between the cam 129 and the stop 115 for bringing about the movement of the stop. The outer periphery 138 of the cam 129 engages a shoulder 140 of the funnel 131 to cause the tube 116 to move completely into the bore 122 in the ball before the stop 115 begins to move from its first position to its second position. The link 137 consists of a cylinder 139 and a piston whose piston rod 141 is surrounded by a coil spring 142. The spring exerts pressure between the cylinder and the rod piston to bias them continuously toward an expanded condition. The cam 129 is flat and two dimensional and it lies vertically in a plane perpendicular to the shaft axis. One end of the cylinder 139 is hingedly connected to the cam 129 by a pin 143 within its periphery at a point substantially spaced from the axis of the shaft 133. The periphery of the cam 129 makes continuous engagement with the shoulder 140 on the funnel 131 and the tube 116.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Valve system for joining a storage container to a use device, comprising:
    (a) a primary valve, including a ball with a bore and a seal formed of an elastomer engaging the ball, and
    (b) a secondary valve including a main body having a passage, a stop movable from a first position closing the passage to a second position in which the passage is not closed, and a tube coaxial of the passage and movable axially from a first position away from the ball to a second position within the bore in the ball.

2. Valve system as recited in claim 1, wherein an actuator is provided to move the stop and the tube in synchronization, from their first positions to their second positions.

3. Valve system for allowing a powder to flow from an upper hopper to a lower mold, comprising:
    (a) a primary valve having a main body with a passage extending along a line extending from the hopper to the mold and connected on one end to the mold, having a ball rotatably mounted in the passage with a bore that may be moved into alignment with the passage, and having an elastomer seal mounted in the passage in contact with the ball,
    (b) an air-tight container mounted between the hopper and the primary valve, the interior of the container being connected to the hopper and to the other end of the passage in the main body of the primary valve, and
    (c) a secondary valve mounted in the container and including a main body having a passage aligned with the line and connected at its upper end to the hopper, including a stop movable from a first position closing the lower end of the passage to a second position, and including a tube extending along the line and axially movable from a first position adjacent the main body to a second position at which the tube lies within the bore of the ball of the primary valve.

4. Valve system as recited in claim 3, wherein an actuating handle mounted externally of the container is connected to the stop and the tube to move them in synchronization from their first positions to their second positions.

5. Valve system as recited in claim 4, wherein the container is provided with a connection for attachment to a gas evacuating means.

6. Valve system as recited in claim 5, wherein a funnel is connected to the top end of the tube to receive powder from the passage in the main body of the secondary valve, and wherein a link is connected between the stop and the funnel to bring about the said synchronization.

7. Valve system as recited in claim 6, wherein the stop is in the form of a cup of pivotally mounted on the main body for swinging movement about an axis extending transversely of the passage, and wherein a shaft concentric with the last-named axis extends from the cup to and through the wall of the container, the actuating handle being attached to the outer end, the shaft.

8. Valve system as recited in claim 7, wherein the stop includes a bell crank integrally formed with the cup, and wherein two guide rods spaced from and parallel to the said line on which the funnel is slidably carried.

9. Valve system as recited in claim 8, wherein the primary valve is provided with a handle to rotate the ball about an axis perpendicular to the said line.

10. Valve system for joining a storage container to a use device, comprising:
    (a) a primary valve including a ball with a bore and seal formed of an elastomer engaging the ball,
    (b) a secondary valve including a main body having a passage, a stop movable from a first position closing the passage to a second position in which the passage is not closed, and a tube coaxial of the passage and movable axially from a first position away from the ball to a second position within the bore in the ball, and (c) an actuator including a cam is provided to move the stop and the tube in synchronization, from their first positions to their second positions.

11. Valve system as recited in claim 10, wherein a rotatable shaft is mounted between the primary valve and the secondary valve, the cam being fastened to the shaft for rotation therewith, wherein a link is connected between the cam and the stop for the movement thereof, and wherein the outer periphery of the cam engages the tube to allow it to move completely into the bore in the ball before the stop begins to move from its first position to its second position.

12. Valve system as recited in claim 11, wherein the link consists of a cylinder and piston with a coil spring lying between them to bias them continually toward an expanded condition.

13. Valve system as recited in claim 12, wherein the passage is vertical, wherein the shaft is rotatable about a horizontal axis, wherein the cam is flat and two-dimensional and lies vertically in a plane perpendicular to the shaft axis, wherein one end of the link is hingedly connected to the cam within its periphery at a point substantially spaced from the shaft axis, and wherein the periphery of the cam makes continuous engagement with a shoulder on the tube.

* * * * *